US008384688B2

United States Patent
Zhan et al.

(10) Patent No.: US 8,384,688 B2
(45) Date of Patent: Feb. 26, 2013

(54) TOUCH SCREEN DISPLAY DEVICE AND METHOD OF DRIVING THE SAME

(75) Inventors: Zhi-Feng Zhan, Yongin-si (KR); Byung-Ki Jeon, Seoul (KR); Jong-Woung Park, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 724 days.

(21) Appl. No.: 12/628,323

(22) Filed: Dec. 1, 2009

(65) Prior Publication Data

US 2010/0253640 A1 Oct. 7, 2010

(30) Foreign Application Priority Data

Apr. 2, 2009 (KR) ........................ 10-2009-0028481

(51) Int. Cl.
*G06F 3/045* (2006.01)

(52) U.S. Cl. ........................................ 345/174; 345/173

(58) Field of Classification Search .................. None
See application file for complete search history.

(56) References Cited

U.S. PATENT DOCUMENTS

| 8,154,529 B2 * | 4/2012 | Sleeman et al. ............... 345/173 |
| 8,258,986 B2 * | 9/2012 | Makovetskyy .................. 341/33 |
| 2008/0117182 A1 * | 5/2008 | Um et al. ...................... 345/173 |

FOREIGN PATENT DOCUMENTS

| KR | 1020040056013 | 6/2004 |
| KR | 100672539 | 1/2007 |
| KR | 1020080013638 | 2/2008 |
| KR | 1020080062500 | 7/2008 |

\* cited by examiner

*Primary Examiner* — Lixi C Simpson
(74) *Attorney, Agent, or Firm* — Cantor Colburn LLP (57) ABSTRACT

A touch screen display device includes; a touch screen display panel including; first sensing lines which extend in a first direction, second sensing lines which extend in a second direction, and a plurality of touch sensors located at a plurality of sensing positions, each of which provides touch data or untouch data, a readout unit which reads the touch data or the untouch data and outputs the read data as sensing data corresponding to each of the sensing positions, and a sensing unit which groups the sensing positions into at least one pre-touch areas using the sensing data and which recognizes at least one touch positions using the pre-touch areas, wherein when first and third sensing positions from among first through third sensing positions provide the touch data while the second sensing position provides the untouch data, the sensing unit recognizes the untouch data as the touch data.

18 Claims, 10 Drawing Sheets

TOUCH SCREEN DISPLAY DEVICE AND METHOD OF DRIVING THE SAME

This application claims priority to Korean Patent Application No. 10-2009-0028481, filed on Apr. 2, 2009, and all the benefits accruing therefrom under 35 U.S.C. §119, the content of which in its entirety is herein incorporated by reference.

BACKGROUND OF THE INVENTION

1. Field of the Invention

Exemplary embodiments of the present invention relates to a touch screen display device, and more particularly, to a touch screen display device with enhanced reliability.

2. Description of the Related Art

A touch screen display device is a display device having a touch screen function. A user may touch a point on a touch screen display device using a portion of the body to instruct the execution of a desired operation. Since display devices having the touch screen function provide an intuitive interface by which a user can easily input information, they are widely being used.

A touch screen display device includes a plurality of pixels which display images and a plurality of touch sensors which sense positions touched by a user. A gate signal and a data signal are typically transmitted to each pixel, and each touch sensor provides an output signal according to whether or not it has been touched.

BRIEF SUMMARY OF THE INVENTION

Exemplary embodiments of the present invention provide a touch screen display device with enhanced reliability.

Exemplary embodiments of the present invention also provide a method of driving a touch screen display device with enhanced reliability.

However, the present invention is not restricted to the exemplary embodiments set forth herein. The above and other aspects of the present invention will become more apparent to one of ordinary skill in the art to which the present invention pertains by referencing the detailed description of the present invention given below.

According to an exemplary embodiment of the present invention, a touch screen display device includes; a touch screen display panel which includes; a plurality of first sensing lines which extend in a first direction, a plurality of second sensing lines which extend in a second direction substantially perpendicular to the first direction, and a plurality of touch sensors which are respectively located at a plurality of sensing positions defined in regions where the plurality of first sensing lines are aligned with the plurality of second sensing lines, respectively, and each of which provides one of a touch data and an untouch data according to whether an individual touch sensor corresponding to the aligned first sensing line and second sensing line has been touched, a readout unit which reads one of the touch data and the untouch data from each of the touch sensors and outputs the read data as sensing data corresponding to each of the sensing positions, and a sensing unit which groups the sensing positions into at least one pre-touch area using the sensing data and which recognizes at least one touch position using the at least one pre-touch area, wherein at least one touch sensor provides touch data, wherein when a first sensing position and a third sensing position from among first through third sensing positions arranged sequentially in the second direction provide the touch data while the second sensing position provides the untouch data, the sensing unit recognizes the untouch data provided at the second sensing position as the touch data and groups the first through third sensing positions into a pre-touch area.

According to another exemplary embodiment of the present invention, a touch screen display device includes; a touch screen display panel which includes; a plurality of first sensing lines which extend in a first direction, a plurality of second sensing lines which extend in a second direction substantially perpendicular to the first direction, and a plurality of touch sensors which are respectively located at a plurality of sensing positions defined in regions where the plurality of first sensing lines are aligned with the plurality of second sensing lines, respectively, and each of which provides one of a touch data and an untouch data according to whether an individual touch sensor corresponding to the aligned first sensing line and second sensing line has been touched, a readout unit which reads one of the touch data and the untouch data from each of the plurality of touch sensors and outputs the read data as sensing data corresponding to each of the plurality of sensing positions, and a sensing unit which groups the sensing positions into at least one pre-touch area using the sensing data and which recognizes at least one touch positions using the at least one pre-touch area when at least one touch sensor provides touch data, wherein when all of a plurality of sensing positions included in a pre-touch area correspond to the same second sensing line, the pre-touch area is recognized as an untouch position.

According to another exemplary embodiment of the present invention, a method of driving a touch screen display device includes; reading one of touch data and untouch data from each of a plurality of touch sensors and providing the read data as sensing data which corresponds to each of a plurality of sensing positions corresponding to respective locations of the plurality of touch sensors; and grouping the sensing positions into at least one pre-touch area based on the sensing data and recognizing at least one touch position based on the pre-touch area using a sensing unit when at least one touch sensor reads touch data, wherein each of the plurality of touch sensors are respectively located at the plurality of sensing positions which are defined in regions where a plurality of first sensing lines extending in a first direction respectively are aligned with a plurality of second sensing lines extending in a second direction, and, in the grouping of the sensing positions into the pre-touch areas, when a first sensing position and a third sensing position from among first through third sensing positions arranged sequentially in the second direction provide the touch data while the second sensing position provides the untouch data, the untouch data provided at the second sensing position is recognized as the touch data, and the first through third sensing positions are grouped into a pre-touch area.

BRIEF DESCRIPTION OF THE DRAWINGS

The above and other aspects, advantages and features of the present invention will become more apparent by describing in detail exemplary embodiments thereof with reference to the attached drawings, in which.

DETAILED DESCRIPTION OF THE INVENTION

The invention now will be described more fully hereinafter with reference to the accompanying drawings, in which exemplary embodiments of the invention are shown. This invention may, however, be embodied in many different forms and should not be construed as being limited to the embodiments set forth herein. Rather, these exemplary embodiments are provided so that this disclosure will be thorough and complete and will fully convey the concept of the invention to those skilled in the art. Like reference numerals refer to like elements throughout the specification.

It will be understood that when an element is referred to as being "on" another element, it can be directly on the other element or intervening elements may be present therebetween. In contrast, when an element is referred to as being "directly on" another element or layer, there are no intervening elements present. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Figure 1:
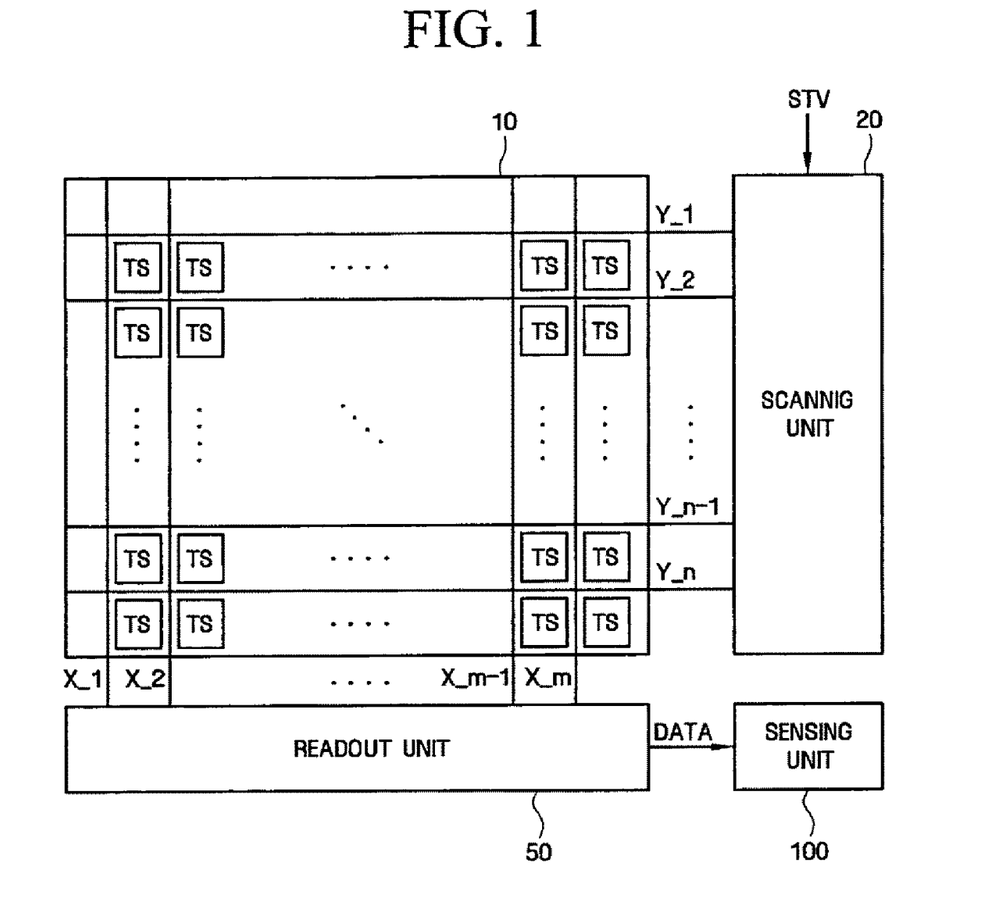
FIG. 1 is a block diagram of an exemplary embodiment of a touch screen display device according to the present invention.
Figure 2:
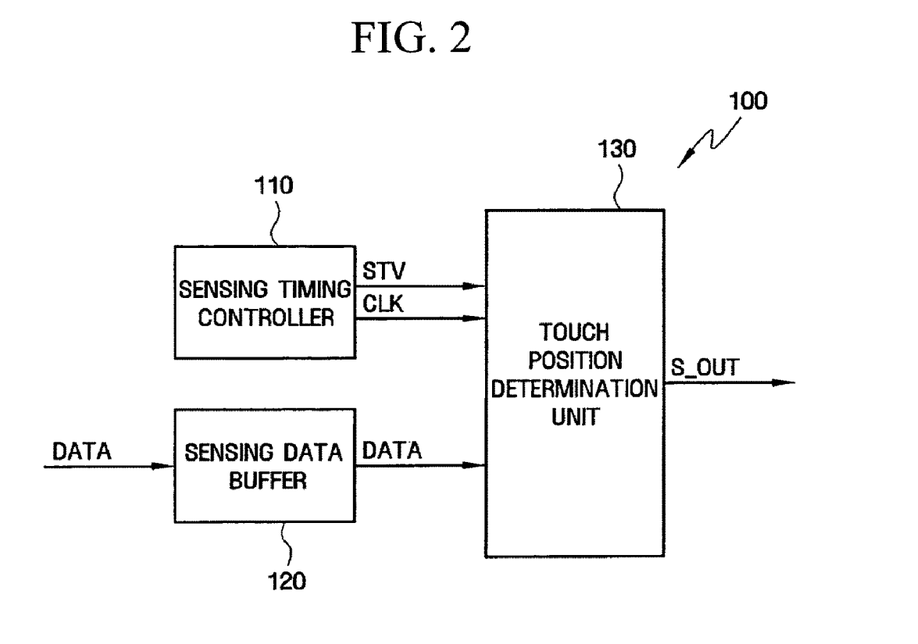
FIG. 2 is a block diagram of an exemplary embodiment of a sensing unit shown in FIG. 1.
Figure 3:
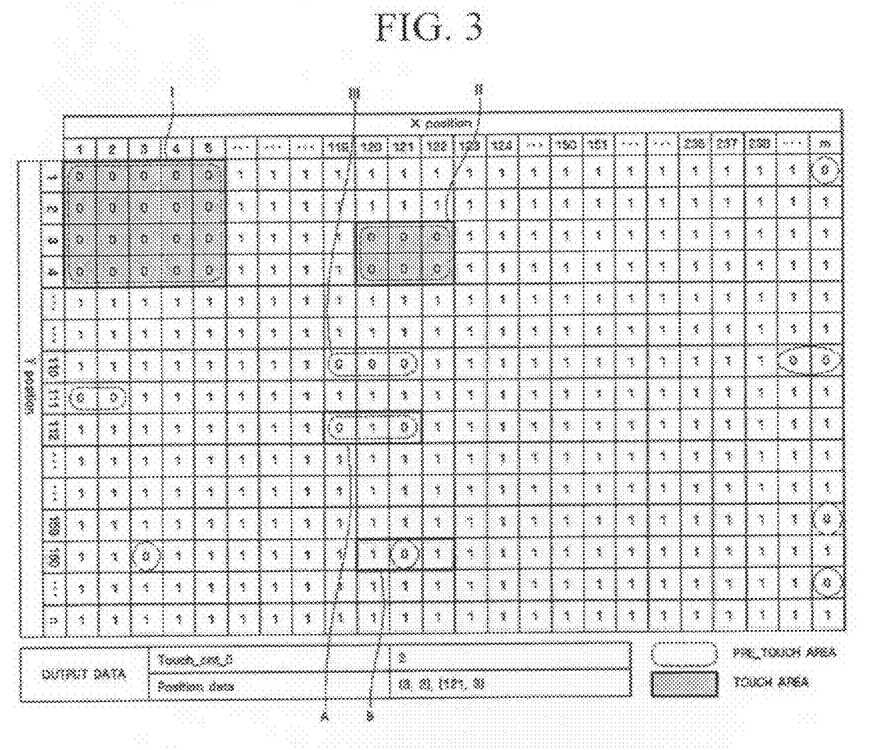
FIG. 3 is a schematic diagram illustrating an exemplary embodiment of the operation of the exemplary embodiment of a touch screen display device shown in FIG. 1.

Hereinafter, an exemplary embodiment of a touch screen display device and a method of driving the same according to the present invention will be described with reference to FIGS. 1 through 3. FIG. 1 is a block diagram of an exemplary embodiment of a touch screen display device according to the present invention. FIG. 2 is a block diagram of an exemplary embodiment of a sensing unit 100 shown in FIG. 1. FIG. 3 is a diagram illustrating an exemplary embodiment of the operation of the touch screen display device shown in FIG. 1.

Referring to FIG. 1, the touch screen display device includes a touch screen display panel 10, a scanning unit 20, a readout unit 50, and the sensing unit 100.

The touch screen display panel 10 includes a plurality of first sensing lines X_1 through X_m which extend in a first direction, a plurality of second sensing lines Y_1 through Y_n which extend in a second direction substantially perpendicular to the first direction, and a plurality of touch sensors TS which are respectively located at sensing positions defined at regions where the first sensing lines X_1 through X_m cross, e.g., are vertically aligned with, the second sensing lines Y_1 through Y_n, respectively. That is, the touch screen display panel 10 may include a plurality of sensing positions which are arranged in a matrix, the first sensing lines X_1 through X_m which correspond to columns of the sensing positions, respectively, and the second sensing lines Y_1 through Y_n which correspond to rows of the sensing positions, respectively.

The touch sensors TS are coupled to the plurality of first and second sensing lines X_1 through X_m and Y_1 through Y_n. Each of the touch sensors TS provides one of touch data and untouch data according to whether it has been touched or not. In addition, each of the touch sensors TS includes a first sensor electrode (not shown) which is connected to one of the first sensing lines X_1 through X_m, a second sensor electrode (not shown) which is connected to one of the second sensing lines Y_1 through Y_n, and a sensor spacer (not shown) which contacts the first and second sensor electrodes to each other when the touch sensor TS is touched. When the touch sensors TS are touched, the first sensing lines X_1 through X_m may be selectively coupled to the second sensing lines Y_1 through Y_n.

Although not shown in the drawing, exemplary embodiments of the touch screen display panel 10 may include a plurality of data lines which extend substantially parallel to the first direction, a plurality of gate lines which extend substantially parallel to the second direction, and a plurality of pixels which are defined in regions where the gate lines and the data lines are vertically aligned with one another, respectively. Each of the plurality of pixels may include a switching element which is connected to a gate line and a data line, and a liquid crystal capacitor and a storage capacitor which are connected to the switching element. In such an exemplary embodiment, the switching element is turned on or off according to a voltage level of the gate line. When the switching element is turned on, a voltage applied to the data line is delivered to the liquid crystal capacitor via the switching element. In the exemplary embodiment wherein the touch screen display is a liquid crystal display ("LCD"), the voltage applied to the data line is then transmitted to a pixel electrode, which controls an orientation of a layer of liquid crystal molecules, which in turn may control the polarization orientation of light passing therethrough. Accordingly, the amount of light that passes through a substrate of the touch screen display is controlled. As a result, an image is displayed on the touch screen display panel 10. Exemplary embodiments include configurations wherein the touch screen display includes alternative types of displays, such as an organic light-emitting display or other similar type of display.

The scanning unit 20 is connected to the second sensing lines Y_1 through Y_n and enables each of the second sensing lines Y_1 through Y_n sequentially during a frame. Specifically, the scanning unit 20 may transmit a scanning signal to the second sensing lines Y_1 through Y_n sequentially in response to a scan start signal STV. In one exemplary embodiment, the scan start signal STV may be applied from an outside source. Accordingly, the second sensing lines Y_1 through Y_n may change voltages from a disable level to an enable level (e.g., in one exemplary embodiment the enable level may be a ground level). That is, the scanning unit 20 may enable and select the touch sensors TS, which are arranged in a matrix, on a row-by-row basis.

The readout unit 50 is connected to the first sensing lines X_1 through X_m. The readout unit 50 reads the touch data or the untouch data from each touch sensor TS and outputs sensing data DATA corresponding to each sensing position to the sensing unit 100. Specifically, when the scanning unit 20 selects the touch sensors TS on a row-by-row basis, the readout unit 50 reads the touch data or the untouch data from each of the selected touch sensors TS. That is, the readout unit 50 may read the touch data or the untouch data from each of the touch sensors TS arranged in a matrix and provide the sensing data DATA on a row-by-row basis.

For example, when a second sensing line selected from the second sensing lines Y_1 through Y_n, e.g., Y_1, has a ground level and when a touch sensor TS is touched, e.g., the touch sensor located in the upper-leftmost corner of the display, and thus a corresponding one of the first sensing lines X_1 through X_m, e.g., X_1, is coupled to the selected second sensing line, the readout unit 50 may read the touch data at a low level from the touch sensor TS and provide the read touch data as the sensing data DATA. On the other hand, when the touch sensor TS is not touched, the corresponding one of the first sensing lines X_1 through X_m may be decoupled from the selected second sensing line. Accordingly, the readout unit 50 may read the untouch data at a high level from the touch sensor TS and provide the read untouch data as the sensing data DATA.

The sensing unit 100 groups a plurality of sensing positions corresponding respectively to the touch sensors TS into one or more pre-touch areas using the sensing data DATA and recognizes touch positions using the pre-touch areas. Referring to FIG. 2, the present exemplary embodiment of the sensing unit 100 may include a sensing data buffer 120, a touch position determination unit 130, and a sensing timing controller 110.

The sensing data buffer 120 receives the sensing data DATA from the readout unit 50 and stores the received sensing data DATA. Specifically, in the present exemplary embodiment the sensing data buffer 120 may store the sensing data DATA that the readout unit 50 read from the touch sensors TS on a row-by-row basis.

An exemplary embodiment of the sensing unit 100 (specifically, the touch position determination unit 130) according to the present invention does not process the sensing data DATA corresponding to all of the touch sensors TS after the readout unit 50 reads the sensing data DATA corresponding to all of the touch sensors TS during a frame. Instead, in the present exemplary embodiment the sensing unit 100 processes the sensing data DATA corresponding to each row of the touch sensors TS immediately after the readout unit 50 reads the sensing data DATA from each row of the touch sensors TS. Therefore, the sensing data buffer 120 may not store the sensing data DATA, which corresponds to all of the touch sensors TS included in the touch screen display panel 10, during a frame, but instead stores the sensing data DATA which corresponds to the touch sensors TS corresponding to a number of rows of second sensing lines, the number being less than the total number of rows of second sensing lines. For example, in one exemplary embodiment, the sensing data buffer 120 may store the sensing data DATA corresponding to a previous row of the touch sensors TS and the sensing data DATA corresponding to a current row of the touch sensors TS. Consequently, the size of the sensing data buffer 120 can be reduced as compared to an embodiment wherein data corresponding to all rows are stored simultaneously.

For ease of description, sensing data provided to the sensing data buffer 120 and sensing data output from the sensing data buffer 120 are indicated by the same reference character "DATA" in FIG. 2.

The touch position determination unit 130 determines touch positions using the sensing data DATA stored in the sensing data buffer 120. Specifically, the touch position determination unit 130 groups a plurality of sensing positions into a pre-touch area using the sensing data DATA provided on a row-by-row basis and recognizes the pre-touch area as a touch area when the pre-touch area satisfies a predetermined condition to be discussed in more detail below. In addition, the touch position determination unit 130 may output a sensing result S_OUT, which includes location values of touch positions, using the number of touch areas recognized during a frame and location values of sensing positions included in the touch areas. The touch position determination unit 130 may operate using a clock signal CLK provided by the sensing timing controller 110 and start the above operation of recognizing touch positions, which correspond to a frame, in response to the scan start signal STV. Exemplary embodiments include configurations wherein the scan start signal STV is the same signal provided to the scanning unit 20. The specific operation of the touch position determination unit 130 will be described in more detail later with reference to FIGS. 4 through 10.

Hereinafter, the operation of the sensing unit 100 will be described in detail with reference to FIG. 3. In FIG. 3, sensing data "0" represents the touch data, e.g., the presence of a touch, and sensing data "1" represents the untouch data, e.g., the absence of a touch.

The sensing unit 100 groups a plurality of sensing positions corresponding to the touch sensors TS into one or more pre-touch areas using the sensing data DATA. Specifically, the sensing unit 100 may group the sensing positions that provide only the touch data into one or more pre-touch areas.

For example, first through third sensing positions may be sequentially arranged in the second direction as indicated by reference character "A" of FIG. 3. As shown in this exemplary embodiment, the first and third sensing positions may provide the touch data, and the second sensing position may provide the untouch data. In this case, the exemplary embodiment of a sensing unit 100 according to the exemplary embodiments of the present invention may recognize the untouch data provided at the second sensing position as the touch data and group the first through third sensing positions into one pre-touch area. Various conditions may lead to the sensing position to yield a faulty readout, such as inadequate pressure applied by a user, manufacturing defects within the touch screen device, e.g., malfunctioning sensors, interference from other electronic devices, etc., what is desired is an apparatus and/or method which recognizes the fault and interprets the faulty readout correctly. That is, even when a sensing position, such as the middle position of the pre-touch area A, which has actually been touched, provides the untouch data, it can be included in a pre-touch area. Thus, the reliability of the touch screen display device can be enhanced. The sensing position indicators as shown in FIG. 3 are simply examples of sensing position data for one frame. The sensing position data will vary from frame to frame dependent upon user input.

In another example, first through third sensing positions may be sequentially arranged in the second direction as indicated by reference character "B" of FIG. 3. Here, the first and third sensing positions may provide the untouch data, and the second sensing position may provide the touch data. In this case, the sensing unit 100 may recognize the touch data provided at the second sensing position as the untouch data, e.g., the middle sensing position is providing a faulty reading. That is, even when a sensing position, which has not actually been touched, provides the touch data, it is recognized as having been untouched. Thus, the reliability of the touch screen display device can be enhanced.

After grouping a plurality of sensing positions into a pre-touch area using the sensing data DATA, the sensing unit 100 recognizes the pre-touch area as a touch area when the pre-touch area satisfies a predetermined condition. Specifically, when a pre-touch area includes two or more rows of sensing positions, the sensing unit 100 may recognize the pre-touch area as a touch area. However, when sensing positions included in a pre-touch area are located in a single row, the sensing unit 100 may not recognize the pre-touch area as a touch area, e.g., the sensing unit 100 determines that the sensing position information for the single row is faulty. That is, when sensing positions included in a pre-touch area correspond to the same sensing line (i.e., when the sensing positions are located in the same row), the sensing unit 10 may not recognize the pre-touch area as a touch area. For example, referring to FIG. 3, the sensing unit 100 may not recognize a pre-touch area III, in which sensing positions are arranged in the same row (a $110^{th}$ row), as a touch area.

After recognizing touch areas, the sensing unit 100 outputs location values of touch positions using the number of touch areas recognized during a frame and location values of sensing positions included in the touch areas. For example, when receiving the sensing data DATA shown in FIG. 3, the sensing unit 100 may recognize first and second touch areas I and II and output two as the number of touch areas. In addition, the sensing unit 100 may output a location value (3, 2) of a first touch position using location values of sensing positions included in the first touch area I and output a location value (121, 3) of a second touch position using location values of sensing positions included in the second touch area II, as will be described in more detail below with reference to FIG. 10.

Hereinafter, the operation of the touch position determination unit 130 will be described in detail with reference to FIGS. 4 through 8. For ease of description, an exemplary embodiment wherein eight or less touch positions are recognized during a frame will be described as an example. However, the present invention is not limited to this exemplary embodiment, and in particular, more touch positions may be recognized.

Figure 4:
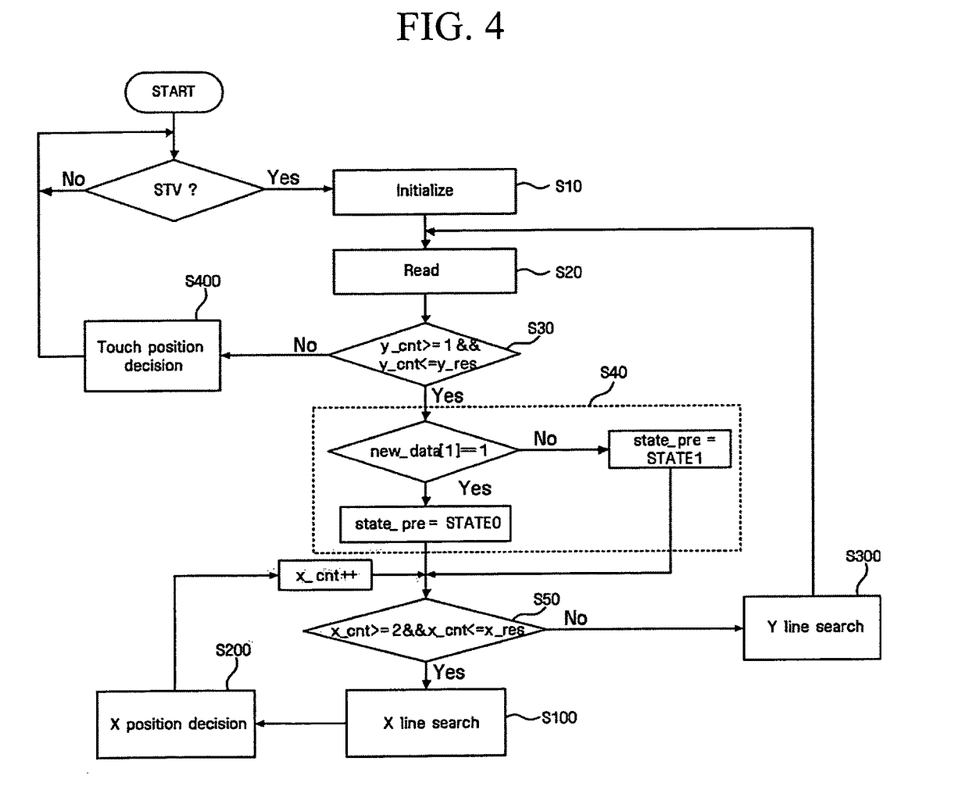
FIG. 4 is a flowchart illustrating an exemplary embodiment of the operation of a touch position determination unit according to the present invention.

FIG. 4 is a flowchart illustrating an exemplary embodiment of the operation of the touch position determination unit 130 according to the present invention.

Referring to FIG. 4, the touch position determination unit 130 is initialized in response to the scan start signal STV which is provided for every frame (operation S10) and reads sensing data which is stored in the sensing data buffer 120 on a row-by-row basis (operation S20).

Then, it is determined whether a second sensing line (hereinafter, referred to as a selected second sensing line, e.g., a second sensing line which receives the enable signal) corresponding to currently read sensing data is the last one Y_n of the second sensing lines Y_1 through Y_n (operation S30). Specifically, the touch position determination unit 130 compares a row location value y_cnt of the selected second sensing line with a row location value y_res of the last second sensing line Y_n (or the number of the second sensing lines Y_1 through Y_n) and determines whether the selected second sensing line is the last second sensing line Y_n based on the comparison result. If the selected second sensing line is the last second sensing line Y_n, the touch position determination unit 130 determines a touch position (operation S400).

However, in one exemplary embodiment, if the selected second sensing line is not the last second sensing line Y_n, the touch position determination unit 130 determines a previous state state_pre based on first sensing data new_data[1] from among each row of the sensing data (operation S40). Here, the first sensing data new_data[1] may be sensing data provided at a sensing position defined by the selected second sensing line and the first one X_1 of the first sensing lines X_1 through X_m. Specifically, when the first sensing data new_data[1] is the untouch data (represented by "1"), the previous state state_pre may be a first state STATE0. When the first sensing data new_data[1] is the touch data (represented by "0"), the previous state state_pre may be a second state STATE1.

Next, it is determined whether the sensing data of all sensing positions corresponding to the selected second sensing line has been processed (operation S50). Specifically, a counter value x_cnt (or a column location value) of each sensing data included in the sensing data currently read from the sensing data buffer 120 is compared with the number x_res of the first sensing lines X_1 through X_m. Then, it is determined by the touch determination unit 130 whether the sensing data of all sensing positions corresponding to the selected second sensing line has been processed based on the comparison result.

When the sensing data of all sensing positions corresponding to the selected second sensing line has been processed, an active second sensing line is searched for (operation S300). On the other hand, when the sensing data of all sensing positions corresponding to the selected second sensing line have not been processed, an active first sensing line from among the first sensing lines X_1 through X_m is searched for (operation S100), and a representative value of the searched active first sensing line is determined (operation S200). The above operations are then repeated. Here, a sensing position, that provides the touch data may correspond to a combination of an active first sensing line from among the first sensing lines X_1 through X_m and an active second sensing line from among the second sensing lines Y_1 through Y_n.

Figure 5:
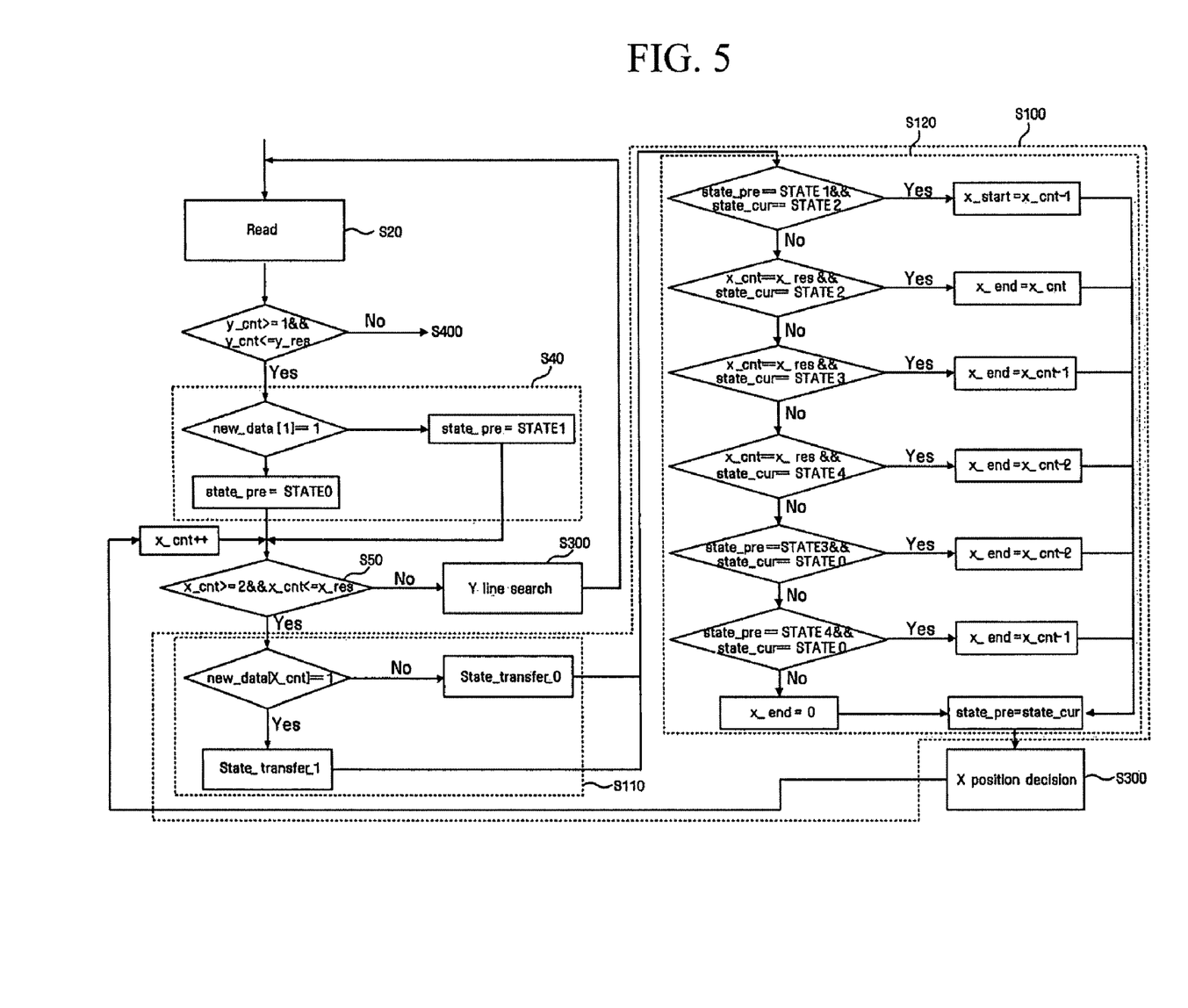
FIG. 5 is a flowchart illustrating an exemplary embodiment of operation S100 of FIG. 4 in more detail.
Figure 6:
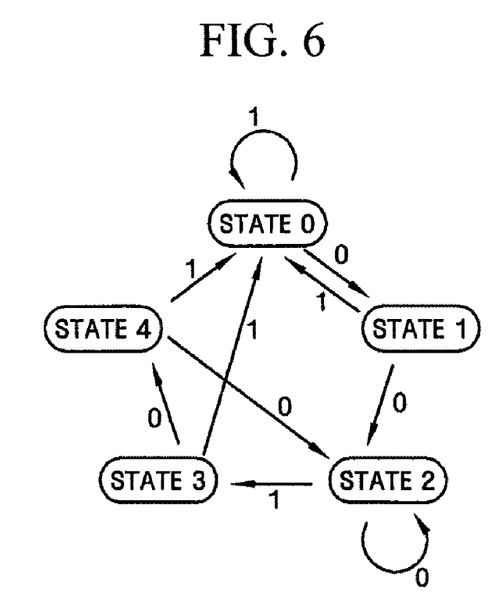
FIG. 6 is a diagram illustrating an exemplary embodiment of operation S110 of FIG. 5 in more detail.

FIG. 5 is a flowchart illustrating operation S100 of FIG. 4 in more detail. FIG. 6 is a diagram illustrating the operation S110 of FIG. 5 in more detail.

Referring to FIG. 5, a state (or a current state) state_cur corresponding to each sensing position is determined based on sensing data corresponding to each sensing position (operation S110). Specifically, referring to FIG. 6, a state may be determined based on whether sensing data new_data[x_cnt] corresponding to a counter value x_cnt is the touch data, e.g., (0) or the untouch data, e.g. (1).

For example, in one exemplary embodiment, when the previous state state_pre is the first state STATE0, if the sensing data new_data[x_cnt] is the untouch data, the first state STATE0 may be maintained. On the other hand, if the sensing data new_data[x_cnt] is the touch data, the first state STATE0 may change to the second state STATE1. When the previous state state_pre is the second state STATE1, if the sensing data new_data[x_cnt] is the untouch data, the second state STATE1 may change to the first state STATE0. On the other hand, if the sensing data new_data[x_cnt] is the untouch data, the second state STATE1 may change to a third state STATE2.

In addition, when the previous state state_pre is the third state STATE2, if the sensing data new_data[x_cnt] is the untouch data, the third state STATE2 may change to a fourth state STATE3. On the other hand, if the sensing data new_data[x_cnt] is the touch data, the third state STATE2 may be maintained. When the previous state state_pre is a fourth state STATE3, if the sensing data new_data[x_cnt] is the untouch data, the fourth state STATE3 may change to the first state STATE0. On the other hand, if the sensing data new_data[x_cnt] is the touch data, the fourth state STATE3 may change to a fifth state STATE4. When the previous state state_pre is the fifth state STATE4, if the sensing data new_data[x_cnt] is the untouch data, the fifth state STATE4 may change to the first state STATE0. On the other hand, if the sensing data new_data[x_cnt] is the touch data, the fifth state STATE4 may change to the third state STATE2.

Next, an active first sensing line X_1 through X_m is searched for using the previous state state_pre, the current state state_cur, and the counter value x_cnt (operation S120). Of three first sensing lines arranged sequentially in the second direction, first and third first sensing lines may be active first sensing lines, and a second first sensing line may be a non-active first sensing line. In such an exemplary embodiment, the second first sensing line may be recognized as an active first sensing line in an exemplary embodiment of the present invention. In addition, of three first sensing lines arranged sequentially in the second direction, first and third first sensing lines may be non-active first sensing lines, and the second first sensing line may be an active first sensing line. In such an exemplary embodiment, the second first sensing line may be recognized as a non-active first sensing line.

When two or more active first sensing lines found are arranged successively in the second direction, a column location value x_start corresponding to a first one of the found active first sensing lines and a column location value x_end corresponding to a last one of the found active first sensing lines are determined.

Specifically, when the previous state state_pre and the current state state_cur are the second state STATE1 and the third state STATE2, respectively, if the sensing data new_data[x_cnt] is a value of "111100," the column location value x_start may be x_cnt−1. In addition, when the counter value x_cnt is x_res and when the current state state_cur is the third state STATE2, if the sensing data new_data[x_cnt] is "100000," the column location value x_end may be x_cnt. When the current state state_cur is the fourth state STATE3, if the sensing data new_data[x_cnt] is "100001," the column location value x_end may be x_cnt−1. When the counter value x_cnt is x_res and when the current state state_cur is the fifth state STATE4, if the sensing data new_data[x_cnt] is "100010," the column location value x_end may be x_cnt−2. When the previous state state_pre is the fourth state STATE3 and the current state state_cur is the first state STATE0, if the sensing data new_data[x_cnt] is "1000011," the column location value x_end may be x_cnt−2. When the previous state state_pre is the fifth state STATE4 and the current state_cur is the first state STATE0, if the sensing data new_data[x_cnt] is "1000101," the column location value x_end may be x_cnt−1. In other exemplary, the column location value x_end may be initialized to zero, and the previous state state_pre may change to the current state state_cur.

Figure 7:
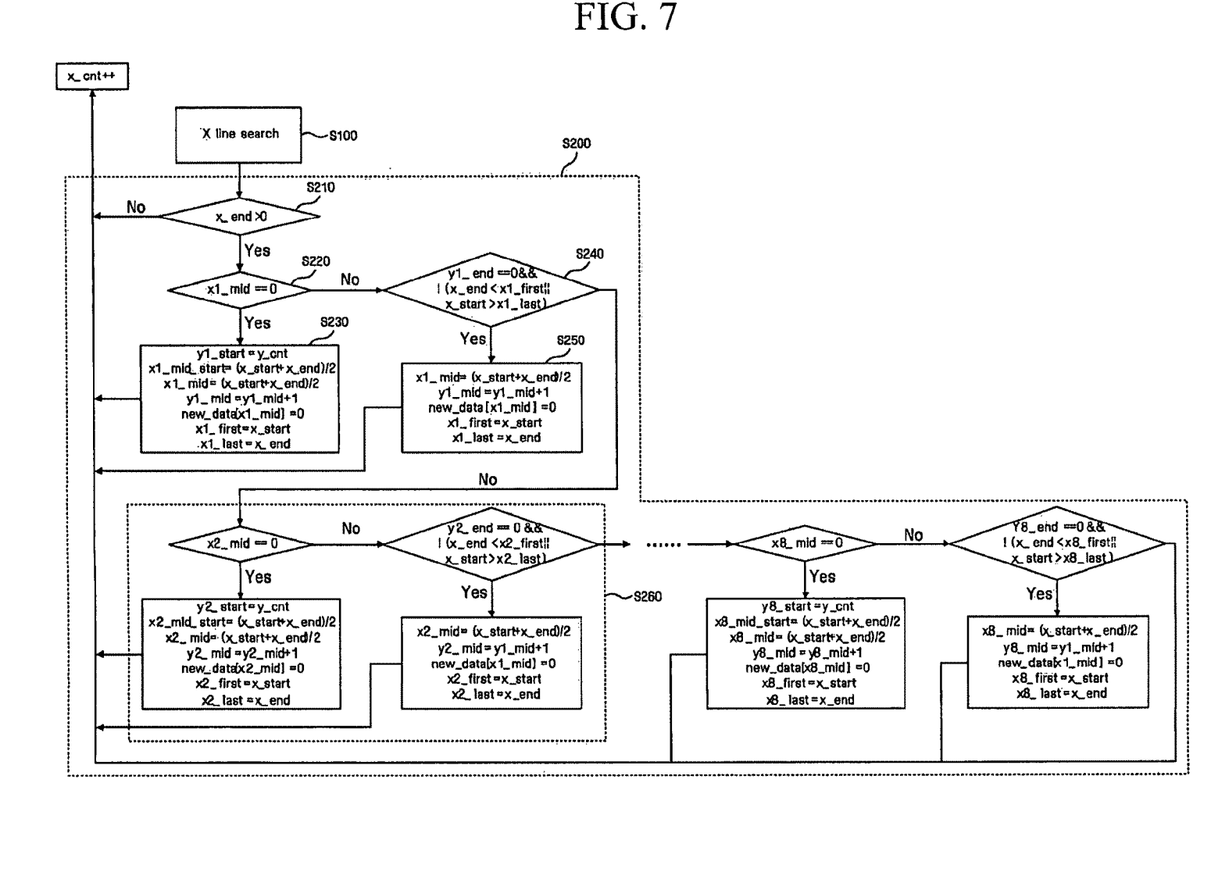
FIG. 7 is a flowchart illustrating an exemplary embodiment of operation S200 of FIG. 4 in more detail.
Figure 8A:
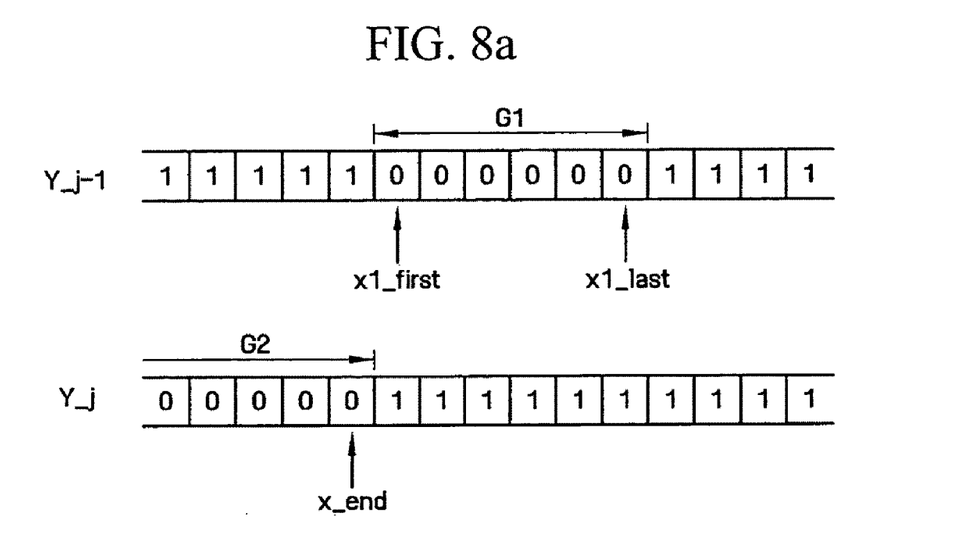
FIGS. 8A and 8B are diagrams illustrating an exemplary embodiment of operation S240 of FIG. 7 in more detail.
Figure 8B:
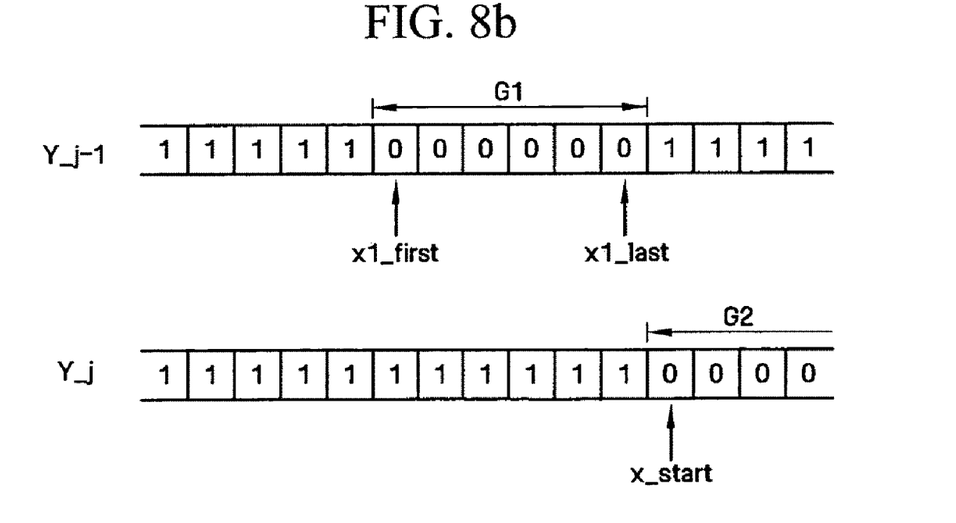

FIG. 7 is a flowchart illustrating operation S200 of FIG. 4 in more detail. FIGS. 8A and 8B are diagrams illustrating an exemplary embodiment of operation S240 of FIG. 7 in more detail. An exemplary embodiment wherein a first pre-touch area is recognized will be described below as an example. However, the present invention is not limited to this exemplary embodiment.

Referring to FIG. 7, it is determined whether touch data exists in a selected row (or a selected second sensing line) (operation S210). When no touch data exists in the selected row, the counter value x_cnt is increased by one. When the touch data exists in the selected row, it is determined whether representative values x1_mid of active first sensing lines in the first pre-touch area have been initialized (operation S220).

In the exemplary embodiment wherein the representative values x1_mid have been initialized, a representative value x1_mid_start of a first one of the active first sensing lines is determined using the column location values x_start and x_end, and a representative value y1_start of a first one of active second sensing lines is determined using the row location value y_cnt (operation S230). In such an exemplary embodiment, x_mid_start may be the mean of x_start and x_end. The number y1_mid of second sensing lines included in the first pre-touch area may be counted, and sensing data new_data[x1_mid] of a sensing position corresponding to x_mid_start may be changed to the touch data. In addition, x_start and x_end may be stored in x1_start and x1_end, respectively.

In the exemplary embodiment wherein the representative values x1_mid have not been initialized, it is determined whether sensing positions, which provide the touch data in the selected row, are included in the first pre-touch area (operation S240). Specifically, when x_end in a selected row Y_j is less than x1_first in a previous row Y_j−1 as shown in FIG. 8A or when x_start in the selected row Y_is greater than x1_last in the previous row Y_j−1 as shown in FIG. 8B, it may be determined that the sensing positions, which provide the touch data in the selected row, are not included in the first pre-touch area. In other exemplary embodiments, it may be determined that the sensing positions, which provide the touch data in the selected row, are included in the first pre-touch area.

That is, a first sensing group G1 may include a plurality of sensing positions which provide the touch data, have a first row location value, and are arranged successively in the second direction, and a second sensing group G2 may include a plurality of sensing positions which provide the touch data, have a second row location value successive to the first row location value, and are arranged successively in the second direction. In such an exemplary embodiment, when a maximum column location value from among column location values of the sensing positions included in the first sensing group G1 is less than a minimum column location value from among column location values of the sensing positions included in the second sensing group G2, or when a minimum column location value from among the column location values of the sensing positions included in the first sensing group G1 is greater than a maximum column location value from among the column location values of the sensing positions included in the second sensing group G2, the first and second sensing groups G1 and G2 may be included in different pre-touch areas.

When the selected row is included in the first pre-touch area, the representative values x1_mid of the active first sensing lines in the selected row are determined using x_start and x_end (operation S250). In one exemplary embodiment, x1_mid may be the mean of x_start and x_end.

The number y1_mid of the second sensing lines included in the first pre-touch area may be counted, and sensing data new_data[x1_mid] of a sensing position corresponding to x1_mid may be changed to the touch data. In addition, x_start and x_end may be stored in x1_start and x1_end, respectively.

When the selected row is not included in the first pre-touch area, it is determined whether the selected row is included in a second pre-touch area (operation S260).

Figure 9:
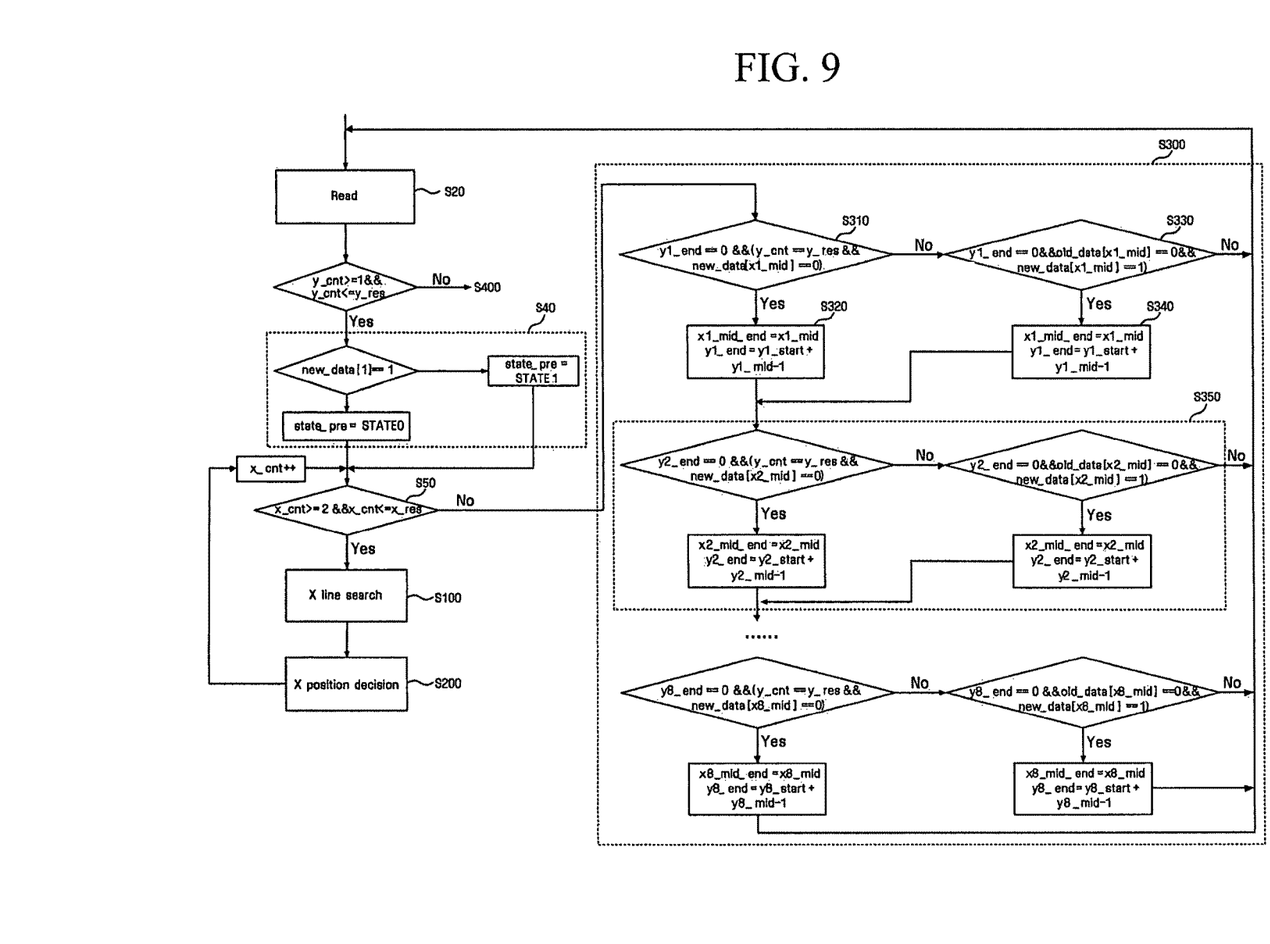
FIG. 9 is a flowchart illustrating an exemplary embodiment of operation S300 of FIG. 4 in more detail.

FIG. 9 is a flowchart illustrating an exemplary embodiment of operation S300 of FIG. 4 in more detail. An exemplary embodiment wherein a first pre-touch area is recognized will be described below as an example. However, the present invention is not limited to this exemplary embodiment.

Referring to FIG. 9, it is determined whether a representative value y1_end of a last active second sensing line in a first pre-touch area has been initialized, whether the touch data exists in a selected row, and whether the selected row is a last second sensing line (operation 310). When the representative value y1_end of the last active second sensing line in the first pre-touch area has been initialized, when the touch data exists in the selected row, and when the selected row is the last second sensing line, a representative value x1_end_end of a last active first sensing line is determined using x_mid, and a representative value of a last active second sensing line is determined using y1_start and y1_mid (operation S320). Then, operation S350, in which it is determined whether the selected row is included in a second pre-touch area, is performed.

In the exemplary embodiment wherein the representative value y1_end of the last active second sensing line in the first pre-touch area has not been initialized, when the touch data does not exist in the selected row, and when the selected row is not the last second sensing line, it is determined whether the selected row, that is, the selected second sensing line, is an active second sensing line (operation S330). Specifically, when sensing data old_data[x1_mid] of a sensing position corresponding to x1_mid in the selected row is the touch data, it is determined that the selected second sensing line is an active second sensing line. Then, operation S20 is performed. Alternatively, when sensing data old_data[x1_mid] of a sensing position corresponding to x1_mid in a previous row is the touch data, if the sensing data old_data[x1_mid] of the sensing position corresponding to x1_mid in the selected row is the untouch data, it is determined that the selected second sensing line is a non-active second sensing line. Next, representative values x_1mid_end and y1_end of last active first and second sensing lines are determined (operation S340). Then, operation S350 is performed.

Figure 10:
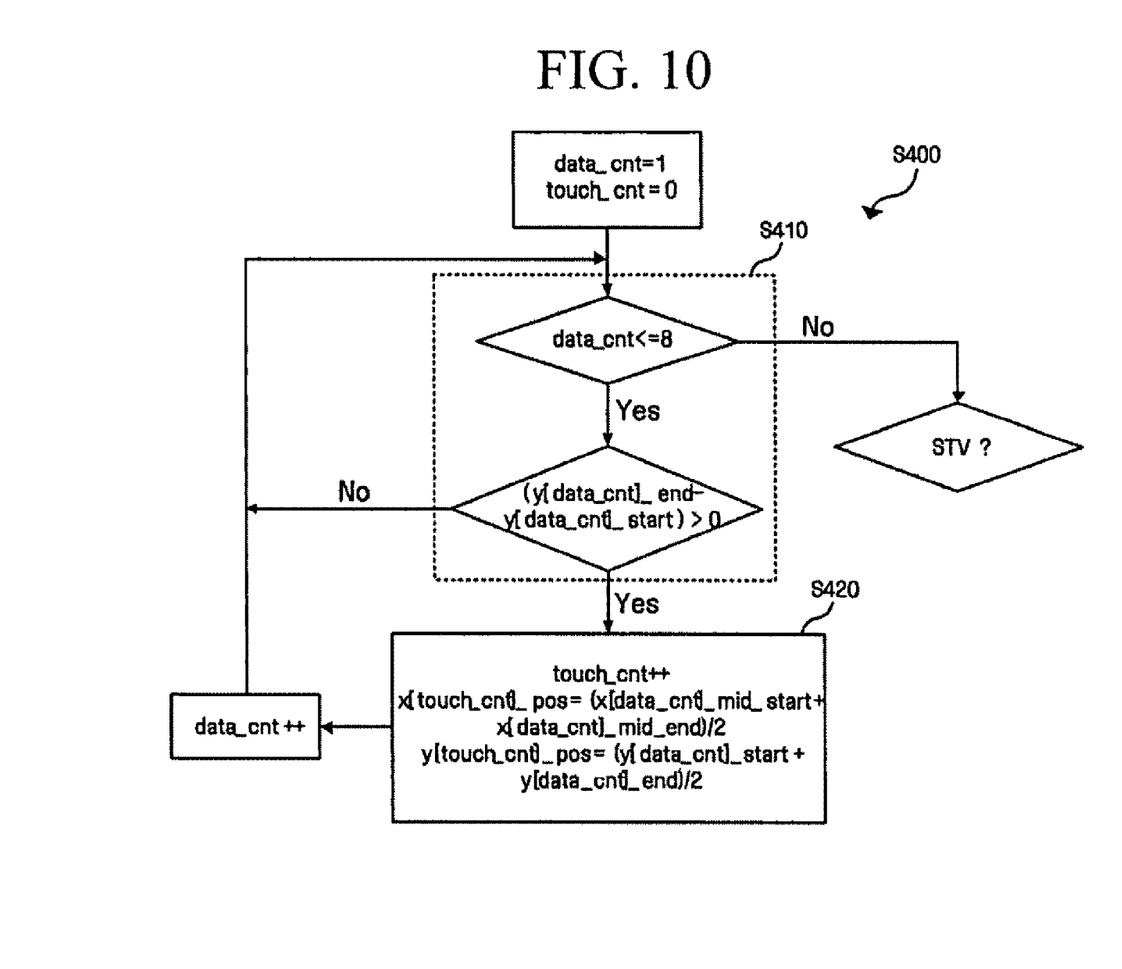
FIG. 10 is a flowchart illustrating an exemplary embodiment of operation S400 of FIG. 4 in more detail.

FIG. 10 is a flowchart illustrating an exemplary embodiment of operation S400 of FIG. 4 in more detail. Referring to FIG. 10, it is determined whether pre-touch areas decided through the operations described above with reference to FIGS. 5 through 9 are touch areas (operation S410). Specifically, a representative value y[data_cnt]_start of a first active second sensing line in each of the pre-touch areas is compared with a representative value y[data_cnt]_end of a last active second sensing line. When the difference between the representative values y[data_cnt]_start and y[data_cnt]_end is greater than zero, the corresponding pre-touch area may be recognized as a touch area. Alternatively, when the difference between the representative values y[data_cnt]_start and y[data_cnt]_end is zero, that is, when sensing positions included in a pre-touch area are all located in the same row, the pre-touch area may not be recognized as a touch area.

Next, the number touch_cnt of touch areas and a location value (x[touch_cnt]_pos, y[touch_cnt] pos) of a touch position corresponding to each touch area are determined (operation S420). In this step, a location value of a touch position may be determined using representative values x[data_cnt]_mid_start and x[data_cnt]_mid_end of first and last active first sensing lines and representative values y[data_cnt]_start and y[data_cnt]_end of first and last active second sensing lines. Specifically, a first location value x[touch_cnt]_pos of a touch position may be determined by calculating the mean of the representative values x[data_cnt]_mid_start and x[data_cnt]_mid_end, and a second location value y[touch_cnt]_pos of the touch position may be determined by calculating the mean of the representative values y[data_cnt]_start and y[data_cnt]_end.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A touch screen display device comprising:
  a touch screen display panel comprising:
    a plurality of first sensing lines which extend in a first direction;
    a plurality of second sensing lines which extend in a second direction substantially perpendicular to the first direction; and a plurality of touch sensors which are respectively located at a plurality of sensing positions defined in regions where the plurality of first sensing lines are aligned with the plurality of second sensing lines, respectively, and each of which provides one of a touch data and an untouch data according to whether an individual touch sensor corresponding to the aligned first sensing line and second sensing line has been touched;

a readout unit which reads one of the touch data and the untouch data from each of the touch sensors and outputs the read data as sensing data corresponding to each of the sensing positions; and a sensing unit which groups the sensing positions into at least one pre-touch area using the sensing data and which recognizes at least one touch positions using the at least one pre-touch area, wherein at least one touch sensor provides touch data, wherein when a first sensing position and a third sensing position from among first through third sensing positions arranged sequentially in the second direction provide the touch data while the second sensing position provides the untouch data, the sensing unit recognizes the untouch data provided at the second sensing position as the touch data and groups the first through third sensing positions into a pre-touch area.

2. The display device of claim 1, wherein when all sensing positions included in a pre-touch area correspond to a same second sensing line of the plurality of second sensing lines, the pre-touch area is recognized as an untouch position.

3. The display device of claim 1, wherein when the first sensing position and the third sensing position from among the first through third sensing positions arranged sequentially in the second direction provide the untouch data while the second sensing position provides the touch data, the sensing unit recognizes the touch data provided at the second sensing position as the untouch data.

4. The display device of claim 1, wherein each sensing position which provides the touch data corresponds to a combination of an active first sensing line from among the plurality of first sensing lines and an active second sensing line from among the plurality of second sensing lines, and the grouping of the sensing positions into the pre-touch areas in the sensing unit comprises:

searching for the active first sensing line from among the plurality of first sensing lines; and searching for the active second sensing line from among the plurality of second sensing lines.

5. The display device of claim 4, wherein the searching of the active first sensing line in the sensing unit comprises:

determining whether each of the plurality of first sensing lines is the active first sensing line using the sensing data which corresponds to each of the sensing positions defined by a second sensing line selected from the plurality of second sensing lines and the plurality of first sensing lines and, when first first sensing lines and third first sensing lines from among three first sensing lines arranged sequentially in the second direction are the active first sensing lines while a second first sensing line is a non-active first sensing line; and recognizing the second first sensing line as the active first sensing line.

6. The display device of claim 5, wherein the searching of the active first sensing line in the sensing unit comprises:

determining a state corresponding to each sensing position based on the sensing data corresponding to each sensing position; and recognizing whether each of the plurality of first sensing lines is the active first sensing line based on a determined state.

7. The display device of claim 5, wherein when two or more active first sensing lines found are arranged successively in the second direction, representative location values of the found active first sensing lines are determined using column location values which correspond respectively to first active first sensing lines and last active first sensing lines from among the found active first sensing lines.

8. The display device of claim 1, wherein when a first sensing group comprises a plurality of sensing positions which provide the touch data have a first row location value, and are arranged successively in the second direction, and when a second sensing group comprises a plurality of sensing positions which provide the touch data, have a second row location value successive to the first row location value, and are arranged successively in the second direction, when a maximum column location value from among column location values of the sensing positions included in the first sensing group is less than a minimum column location value from among column location values of the sensing positions included in the second sensing group and when a minimum column location value from among the column location values of the sensing positions included in the first sensing group is greater than a maximum column location value from among the column location values of the sensing positions included in the second sensing group, the first sensing group and the second sensing group are included in different pre-touch areas.

9. The display device of claim 1, wherein the sensing unit comprises:

a sensing data buffer which stores the sensing data corresponding to each of the sensing positions defined by the first sensing lines and two adjacent second sensing lines; and a touch position determination unit which outputs a number of touch positions recognized during a frame and location values of the touch positions using the sensing data stored in the sensing data buffer.

10. The display device of claim 9, further comprising a scanning unit which sequentially enables the plurality of second sensing lines, wherein the readout unit reads one of the touch data and the untouch data from each of the touch sensors coupled to the enabled second sensing lines.

11. A touch screen display device comprising:

a touch screen display panel comprising:

a plurality of first sensing lines which extend in a first direction;

a plurality of second sensing lines which extend in a second direction substantially perpendicular to the first direction; and a plurality of touch sensors which are respectively located at a plurality of sensing positions defined in regions where the plurality of first sensing lines are aligned with the plurality of second sensing lines, respectively, and each of which provides one of a touch data and an untouch data according to whether an individual touch sensor corresponding to the aligned first sensing line and second sensing line has been touched;

a readout unit which reads one of the touch data and the untouch data from each of the plurality of touch sensors and outputs the read data as sensing data corresponding to each of the plurality of sensing positions; and a sensing unit which groups the sensing positions into at least one pre-touch area using the sensing data and which recognizes at least one touch position using the at least one pre-touch area when at least one touch sensor provides touch data, wherein when all of a plurality of sensing positions included in a pre-touch area correspond to the same second sensing line, the pre-touch area is recognized as an untouch position.

12. The display device of claim 11, wherein when a first sensing position and a third sensing position from among first through third sensing positions arranged sequentially in the second direction provide the untouch data while the second sensing position provides the touch data, the sensing unit recognizes the touch data provided at the second sensing position as the untouch data.

13. The display device of claim 11, wherein the sensing unit comprises:
 a sensing data buffer which stores the sensing data corresponding to each of the sensing positions defined by the plurality of first sensing lines and two adjacent ones of the plurality of second sensing lines; and
 a touch position determination unit which outputs a number of touch positions recognized during a frame and location values of the touch positions using the sensing data stored in the sensing data buffer.

14. A method of driving a touch screen display device, the method comprising:
 reading one of touch data and untouch data from each of a plurality of touch sensors and providing the read data as sensing data which corresponds to each of a plurality of sensing positions corresponding to respective locations of the plurality of touch sensors; and
 grouping the sensing positions into at least one pre-touch area based on the sensing data and recognizing one or more touch positions based on the at least one pre-touch area using a sensing unit when at least one touch sensor reads touch data,
 wherein each of the plurality of touch sensors are respectively located at the plurality of sensing positions which are defined in regions where a plurality of first sensing lines extending in a first direction respectively are aligned with a plurality of second sensing lines extending in a second direction, and, in the grouping of the sensing positions into the pre-touch areas, when a first sensing position and a third sensing position from among first through third sensing positions arranged sequentially in the second direction provide the touch data while the second sensing position provides the untouch data, the untouch data provided at the second sensing position is recognized as the touch data, and the first through third sensing positions are grouped into a pre-touch area.

15. The method of claim 14, wherein when all of a plurality of sensing positions included in a pre-touch area correspond to a same second sensing line, the pre-touch area is recognized as an untouch position.

16. The method of claim 14, wherein when the first sensing position and the third sensing position from among first through third sensing positions arranged sequentially in the second direction provide the untouch data while the second sensing position provides the touch data the grouping of the sensing positions into the pre-touch areas comprises recognizing the touch data provided at the second sensing position as the untouch data.

17. The method of claim 14, wherein the providing of the read data as the sensing data comprises:
 sequentially enabling the second sensing lines; and
 reading at least one of the touch data and the untouch data from each of the touch sensors coupled to the enabled second sensing lines.

18. The method of claim 17, wherein when the sensing data, which corresponds to the touch sensors coupled to the enabled second sensing lines, is provided on a row-by-row basis, the sensing unit is supplied with the sensing data.

* * * * *